(12) United States Patent
Zhou et al.

(10) Patent No.: US 8,754,809 B2
(45) Date of Patent: Jun. 17, 2014

(54) HIGH SENSITIVITY GLONASS/GPS AUTOMATIC FREQUENCY CONTROL

(75) Inventors: Hao Zhou, Mountain View, CA (US); Hao-Jen Cheng, Santa Clara, CA (US); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/041,312

(22) Filed: Mar. 4, 2011

(65) Prior Publication Data

US 2012/0223859 A1    Sep. 6, 2012

(51) Int. Cl.
*G01S 19/24* (2010.01)
*G01S 19/21* (2010.01)
*G01S 19/29* (2010.01)

(52) U.S. Cl.
USPC ............. 342/357.63; 342/357.59; 342/357.68

(58) Field of Classification Search
USPC ............. 342/357.37, 357.59, 357.63, 357.68, 342/357.75; 701/468, 470
See application file for complete search history.

(56) References Cited

U.S. PATENT DOCUMENTS

| 7,183,971 B1 | 2/2007 | Lloyd et al. |
| 2012/0050096 A1 | 3/2012 | Cheng et al. |
| 2012/0075142 A1 | 3/2012 | Zhou et al. |

FOREIGN PATENT DOCUMENTS

WO    WO2009073522    6/2009

OTHER PUBLICATIONS

Partial International Search Report—PCT/US2012/026826—ISA/EPO—Aug. 2, 2012.
Chiou, Tsung Yu et al., "Model Analysis on the Performance for an Inertial Aided FLL-Assisted-PLL Carrier-Tracking Loop in the Presence of Ionospheric Scintillation," Proceedings of ION NTM 2007, Jan. 22, 2007, XP55033831, pp. 1276-1295.
Invitation to Pay Additional Fees for PCT/US2012/026826, mailed Aug. 2, 2012.
Natali, F. D., "AFC Tracking Algorithms for Satellite Links," IEEE International Conference on Communications, Boston, Jun. 19-22, 1983, New York, IEEE, US, XP000793889, vol. 2, Jun. 1, 1983, pp. 915-927.
Ward, Philip W. et al., "Performance Comparisons Between FLL, PLL and a Novel FLL-Assisted-PLL Carrier Tracking Loop Under RF Interference Conditions," Proceedings of the ION GPS 1998, Sep. 15, 1988, XP55033830, pp. 783-795.
Zhao, Sihao et al., "An Open Source GPS/GNSS Vector Tracking Loop—Implementation, Filter Tuning, and Results," Proceedings of ION ITM 2011, Jan. 24, 2011, XP55033832, pp. 1293-1305.
International Search Report and Written Opinion—PCT/US2012/026826—ISA/EPO—Oct. 24, 2012.

*Primary Examiner* — Dao Phan
(74) *Attorney, Agent, or Firm* — Bever, Hoffman & Harms, LLP

(57) ABSTRACT

Updates to an AFC loop can be performed to provide high-sensitivity tracking. A 20 ms update interval and PDI=10 ms is used for every other update. A setting is used for each update between the 20 ms updates. Notably, the setting uses PDI=5 ms. The setting can include first, second, and third cross-dot pairs associated with a first bit, a second bit, and a cross-bit boundary between the first and second bits, respectively. A sum of these pairs can be scaled down when the signal strength is below a predetermined threshold. In another embodiment, the setting can include a first cross-dot pair associated with a first bit and a second cross-dot pair associated with a second bit. A sum of these pairs can also be scaled down when signal strength is below a predetermined threshold.

16 Claims, 14 Drawing Sheets

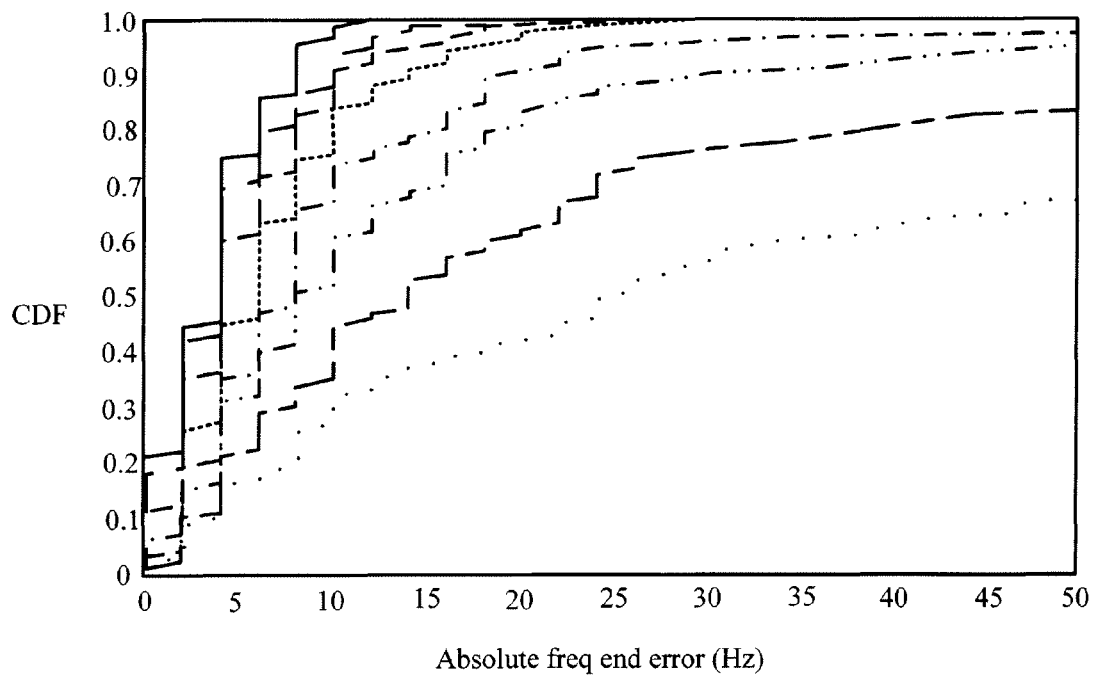
FIG. 15
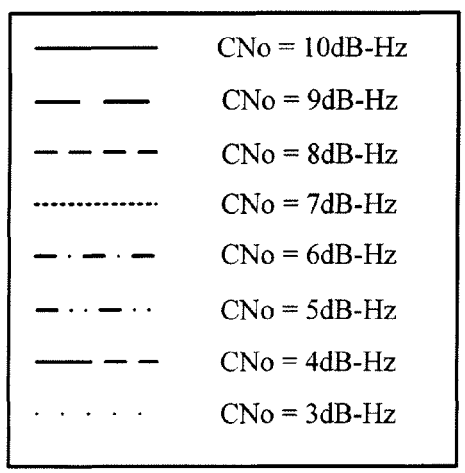

HIGH SENSITIVITY GLONASS/GPS AUTOMATIC FREQUENCY CONTROL

BACKGROUND OF THE INVENTION

1. Field of the Invention

The present invention relates to global location satellite systems and in particular to a high sensitivity automatic frequency control for GLONASS or GPS.

2. Related Art

GPS (global positioning system) and GLONASS (global navigation satellite system) are radio-based satellite systems in operation today. To provide global coverage, GPS uses between 24-32 satellites. Assuming the minimum number of 24 satellites, 4 satellites are deployed in each of six orbits. The six orbital planes' ascending nodes are separated by 60 degrees. In this configuration, a minimum of six satellites should be in view from any given point at any time. To provide global coverage, GLONASS includes 24 satellites, wherein 21 satellites can be used for transmitting signals and 3 satellites can be used as spares. The 24 satellites are deployed in three orbits, each orbit having 8 satellites. The three orbital planes' ascending nodes are separated by 120 degrees. In this configuration, a minimum of five satellites should be in view from any given point at any time.

Both GPS and GLONASS broadcast two signals: a coarse acquisition (C/A code) signal and a precision (P code) signal. In general, global position devices, called receivers herein, lock onto the C/A transmission and not the P transmission. The P transmission is much longer than the C/A transmission and therefore is impractical to directly lock onto. Once a lock is established via C/A transmission, the C/A transmission itself can provide a quick P lock.

The C/A codes for GPS and GLONASS, which can be generated as a modulo-2 sum of two maximum length shift register sequences, are selected for good cross-correlation properties. Each GPS satellite transmits its own unique C/A code, which has an identifiable pseudo-random noise code number (PRN#). In contrast, each GLONASS satellite transmits the same C/A code, and is identified by its channel number (CHN#).

The C/A code includes navigation data, which provides information about the exact location of the satellite, the offset and drift of its on-board atomic clock, and information about other satellites in the system. In GPS, the C/A format for the navigation data includes words, frames, and subframes. The words are 30 bits long; ten words form one subframe; and five subframes form one frame. In GPS, the C/A code is 1023 bits long, is transmitted at 1.023 Mbps, and therefore has a repetition period of 1 ms. In GLONASS, the C/A format is strings, wherein each string includes 1.7 sec of navigation data and 0.3 sec of a time mark sequence. Notably, the C/A code in GLONASS is 511 bits long, is transmitted at 511 kbps, and therefore has the same code repetition period (i.e. 1 ms) as GPS.

Automatic frequency control (AFC) is used to automatically keep a GPS/GLONASS receiver tuned to the frequency of an incoming GPS/GLONASS signal. This tuning is desirable because of a natural drift of the center bandpass frequency of the receiver, which is caused by satellite and user movement, and thermal or mechanical drift in receiver component values.

With the advent of GLONASS satellites now being available to provide position information, it is desirable to have a system that includes the capability of using GPS and/or GLONASS signals for position determination. Therefore, a need arises for a method for providing AFC for GPS, GLONASS, and hybrid GPS/GLONASS receivers.

SUMMARY OF THE INVENTION

A method of providing automatic frequency control tracking for efficient, high-sensitivity reception of GLONASS or GPS signals is provided. In this method, a determination is made whether a channel signal to noise ratio (CNo) is greater than or equal to a predetermined value. When the CNo is greater than or equal to the predetermined value, then pull-in is performed using a first series of predetection integration (PDI) periods with activated decision-directed flips (DDFs). When the CNo is less than the predetermined value, then a second series of PDIs with always deactivated DDFs is used.

Updates to the AFC loop are also performed to provide high-sensitivity tracking. A 20 ms update interval and PDI=10 ms is used for every other update. A setting is used for each update between the 20 ms updates. Notably, the setting uses PDI=5 ms. In one embodiment, the setting can include a first cross-dot pair associated with a first bit, a second cross-dot pair associated with a second bit, the second bit being adjacent the first bit, and a third cross-dot pair associated with a cross-bit boundary between the first and second bits. In this embodiment, a sum of the first, second, and third cross-dot pairs can be scaled down by a value less than 1 when the signal strength is below a predetermined threshold. In another embodiment, the setting can include a first cross-dot pair associated with a first bit and a second cross-dot pair associated with a second bit, the second bit being adjacent the first bit. In this embodiment, a sum of the first and second cross-dot pairs can be scaled down by a value less than 1 when signal strength is below a predetermined threshold.

In another embodiment, a 40 ms update interval and PDI=40 ms are used to increase tracking sensitivity. In this case, the data bit polarity can be wiped off and a $2^{nd}$ order AFC is used.

A frequency rake tracking (FRT) structure for tracking signals is also described. This FRT structure includes a first mixer, a plurality of branches, a selection unit, and a frequency loop filter. The first mixer multiplies an input signal with a feedback signal and generates a modified signal. Each branch processes that modified signal. The selection unit can determine a most likely carrier frequency based on the processed, modified signals and then output a frequency rake discriminator output. The frequency loop filter can receive the frequency rake discriminator output and generate the feedback signal.

Each branch can include a mixer stage, a coherent integration stage, and a non-coherent integration stage. The mixer stage effectively determines the associated frequency of that branch. The coherent integration stage receives an output of the mixer stage of that branch. The non-coherent integration stage receives an output of the coherent integration stage of that branch.

BRIEF DESCRIPTION OF THE FIGURES

FIG. 2 illustrates an exemplary stage I analysis of data bits with PDI=5 ms and DDF ON.

FIG. 6 illustrates an exemplary two-mode, four-stage method for a GLONASS AFC pull-in.

FIG. 7 illustrates an exemplary two-mode, three-stage method for a GPS AFC pull-in.

FIGS. 13-15 illustrate CDFs of absolute end frequency error for various frequency rake trackings.

DETAILED DESCRIPTION OF THE FIGURES

Figure 1:
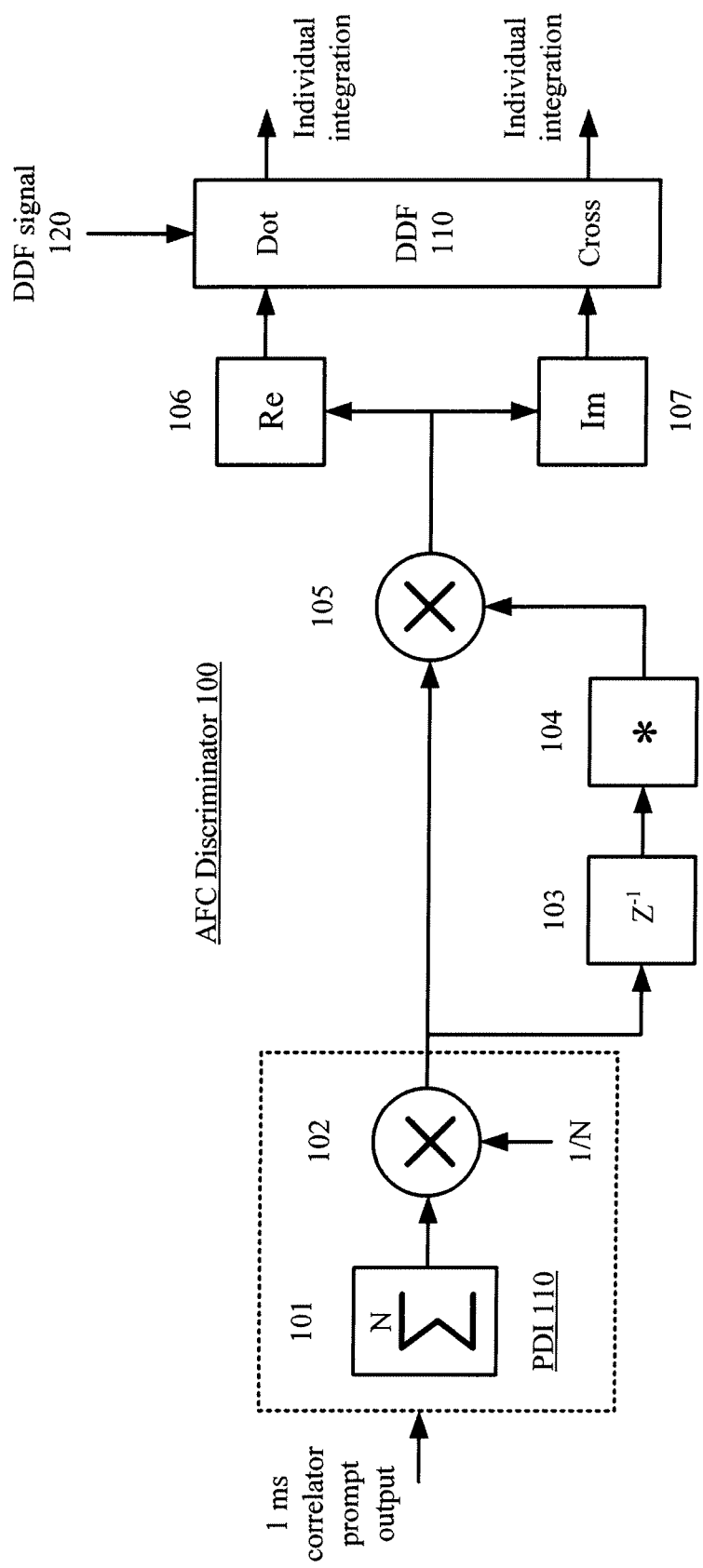
FIG. 1 illustrates an exemplary AFC discriminator, which includes a pre-detection integration (PDI) block.

A high sensitivity automatic frequency control (AFC) design for both GPS and GLONASS is described below. In accordance with one improved technique of providing AFC for a receiver, a pre-detection integration (PDI) period can be programmed. FIG. 1 illustrates an exemplary AFC discriminator 100, which includes a PDI block 110. The input of AFC discriminator 100 comes from a 1 ms correlator prompt output. The output of block 100 goes to the individual integration and then completes the AFC discriminator functionality such as a tan 2(ΣCross, ΣDot). In this embodiment, PDI block 110 includes an integrator 101 and a multiplier 102. Note that integrator 101 uses N samples, wherein N is an integer corresponding to the time (measured in ms) for integrating. Note further that multiplier 102 multiplies the output of integrator 101 by 1/N.

The output of multiplier 102 is provided to another multiplier 105, which further receives a value from a data path. This data path serially subjects the output of multiplier 102 to sample delay 103 and complex conjugation 104. The output of multiplier 105 is provided to both a real component generator 106 and an imaginary component generator 107. The outputs of generators 106 and 107 are called "Dot" and "Cross", respectively, by industry convention. A decision-directed flip (DDF) signal 120 adjusts the polarity of the values of Dot and Cross in a DDF block 110 as follows:

```
if (Dot < 0)
{
    Dot = -Dot;
    Cross = -Cross;
}
```

The operation of an AFC loop in a GLONASS receiver can be analyzed based on four stages: before a 10 ms boundary in the GLONASS data is detected (stage I), after the 10 ms boundary and before a 20 ms boundary (stage II), after the 20 ms boundary and before the time mark detection (stage III), and after time mark detection (stage IV).

In the first stage, because bit boundary information is not yet available, a random PDI starting position is assumed. However, because of the random PDI starting position, a longer PDI has a higher probability of crossing the 10 ms data boundary more frequently. Frequent crossing of the 10 ms data boundary can result in SNR loss as well as erroneous discriminator output. Therefore, PDIs of 1-5 ms can minimize the probability of crossing the 10 ms data boundary based on a random PDI starting position. Note that there are two possible modes: (1) apply the DDF for the cross-dot pair (i.e. DDF ON) or (2) use the cross-dot pair without DDF (i.e. DDF OFF).

Figure 2:
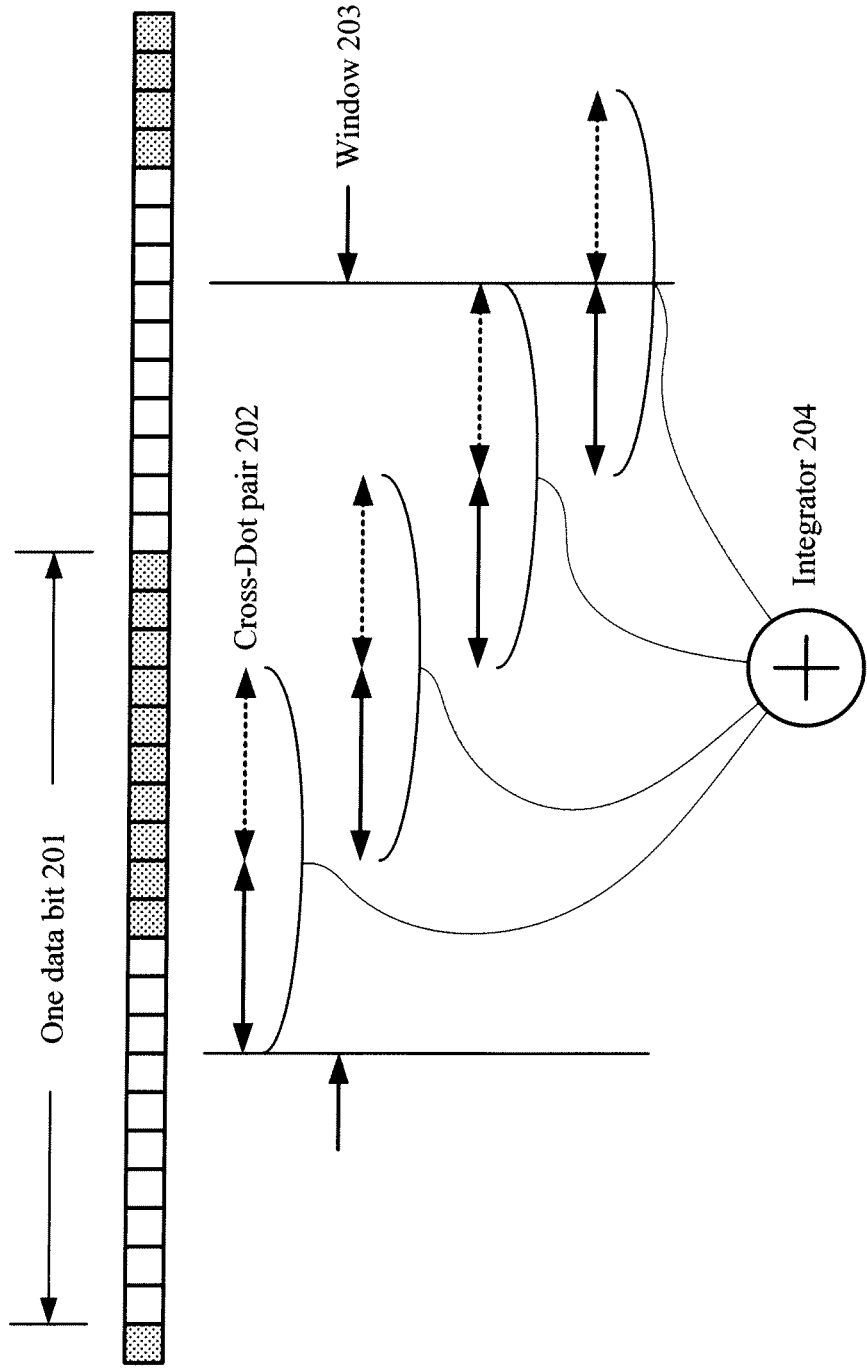

FIG. 2 illustrates an exemplary stage I analysis of data bits (one data bit 201 being labeled, each square indicating 1 ms), with PDI=5 ms and DDF ON (wherein the two arrows, one solid and the other dotted, represent the integration values from the two consecutive PDI periods to each cross-dot pair 202 (one labeled for simplicity). In this embodiment, integrator 204 (shown as an adder in FIG. 2) can integrate cross-dot pairs 202 up to 20 ms, which is shown as a window 203, for discriminator computation.

Figure 3:
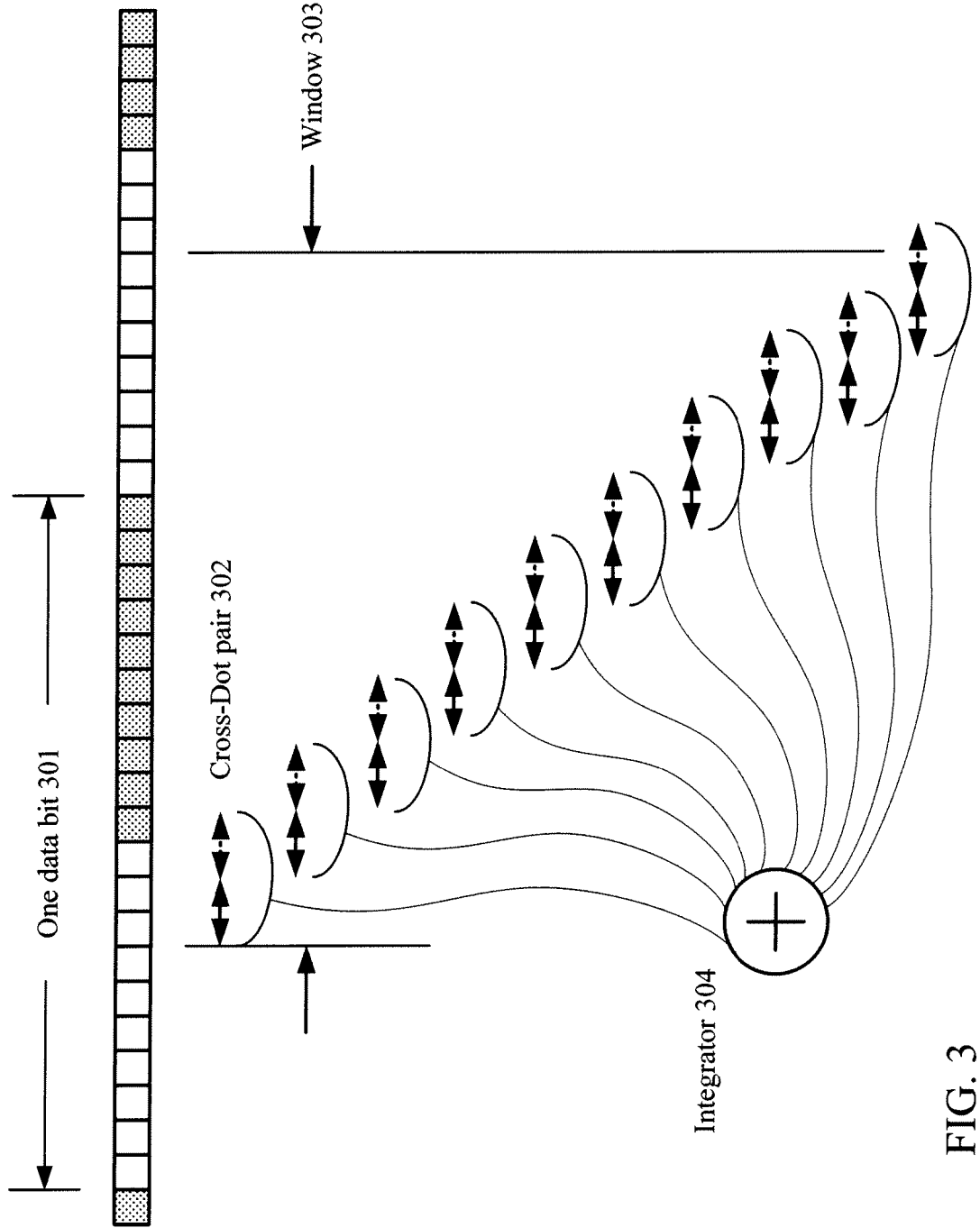
FIG. 3 illustrates an exemplary stage I analysis of data bits with PDI=2 ms and DDF OFF.

FIG. 3 illustrates an exemplary stage I analysis of data bits (one data bit 301 being labeled) (each square indicating 1 ms), with PDI=2 ms and DDF OFF to each cross-dot pair 302 (one labeled for simplicity). In this embodiment, integrator 304 can integrate cross-dot pairs 302 up to 20 ms, which is shown as a window 303, for discriminator computation.

Notably, the pull-in frequency of the DDF OFF mode is about twice of that of the DDF ON mode. However, the steady state tracking error of the DDF OFF mode is higher compared to the DDF ON mode for a medium to strong signal. As determined empirically, the DDF OFF mode is more suitable for lower CNo and larger initial frequency error. In contrast, the DDF ON mode is more suitable for higher CNo and smaller initial frequency error, and leads to smaller steady state tracking error.

Notably, after the 10 ms boundary is detected (stage II), the PDI can be aligned with the 10 ms boundary to improve the integration signal strength and thus tracking performance. Once again, two modes are possible, i.e. DDF ON and DDF OFF. For the DDF ON mode, the effective PDI length can go up to 10 ms. Indeed, the PDI=10 ms has optimal sensitivity (about 20 dB-Hz) and steady state tracking performance.

In contrast to the DDF ON mode, the DDF OFF mode has about twice pull-in frequency and has larger steady state tracking error at high and medium CNo. However, as the CNo further decreases, its tracking error becomes smaller than that of the DDF ON mode. The operation region extends below 17 dB-Hz. Therefore, the DDF OFF mode is more suitable for low CNo in stage II.

In a GLONASS receiver, the 20 ms bit boundary may be detected before the time mark detection because time mark only occurs once every 2 s. If 20 ms bit boundary is detected but time mark is not (stage III), then the 10 ms PDI can be used, but there may be some problems during the unknown time mark period, which is shown below.

For the DDF ON mode in stage II, the PDI has already been able to advance to 10 ms. In one embodiment, the AFC can remain in the DDF ON mode and wait for the time mark detection to complete.

For the DDF OFF mode in stage II, the PDI is equal to 5 ms with the 10 ms boundary crossing cross-dot pairs skipped for discriminator computation. After 20 ms boundary is detected, i.e. stage III, an advance to PDI=10 ms can be attempted. AFC tracking performance can be improved by advancing to PDI=10 ms when signal strength is below the design point (e.g. below 25 dB). This AFC tracking performance can improve the time mark detection for weak signals.

Figure 4:
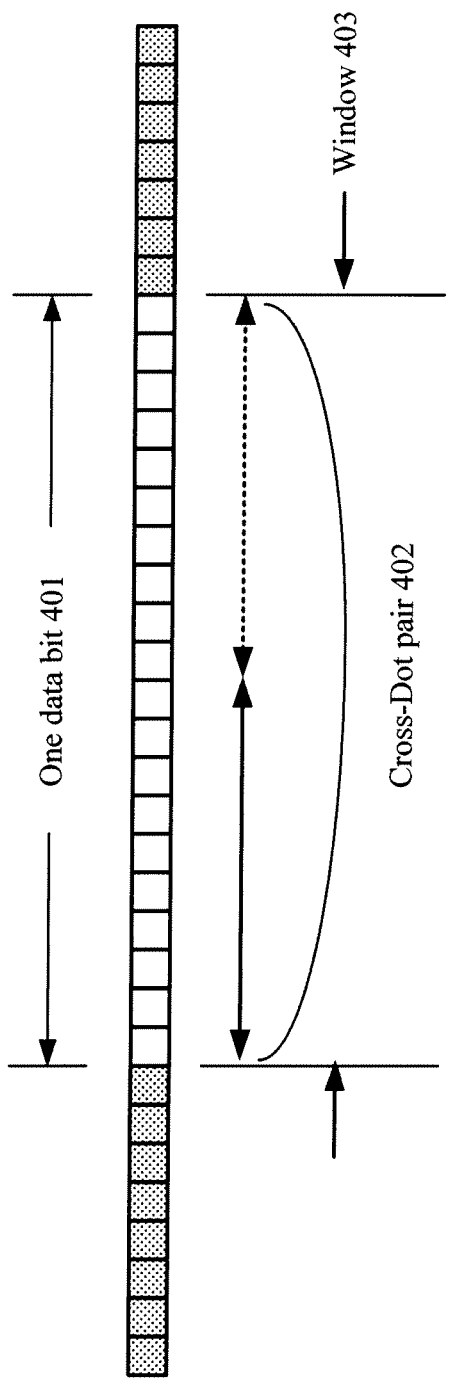
FIG. 4 illustrates an exemplary stage IV analysis of data bits, with cross-dot pairs being integrated up to 20 ms for discriminator computation and PDI=10 ms.

After the time mark sequence is detected (stage IV), a meander sequence in the GLONASS data sequence can be removed and the time mark data can be wiped off. At this point, the AFC enters its stable tracking state. FIG. 4 illustrates an exemplary stage IV analysis of data bits (one data bit 401 being labeled) (each square indicating 1 ms), with cross-dot pairs (e.g. cross-dot pair 402) being obtained from a 20 ms window for discriminator computation using a PDI=10 ms. Note that in stage IV, the PDI starts from the 20 ms boundary of the data bit, as indicated by window 403.

Notably, in stage IV, except the clean time mark period, the signal stream of the GLONASS has the same format as that of the GPS from the perspective of the AFC loop. Therefore, the method used for the GPS AFC can also be used for the GLONASS AFC. In a first method, the 20 ms boundary-crossing cross-dot pair can be skipped without DDF. In a second method, the 20 ms boundary-crossing cross-dot pair can be included in calculating the discriminator output, and a PDI=20 ms can be used during the time-marker period.

Table 1 below summarizes performance of a GLONASS AFC with possible DDF and PDI combinations.

TABLE 1

GLONASS AFC Performance Summary

| Stage, | DDF, | PDI | Tracking signal range | Pull-in frequency @ 40 dB-Hz | RMS freq err @ 40 dB-Hz |
|---|---|---|---|---|---|
| I, | ON, | 2 ms | 24 dB-Hz | 110 Hz | 0.5 Hz |
| I, | ON, | 5 ms | 27 dB-Hz | 45 Hz | 0.3 Hz |
| I, | OFF, | 2 ms | 14 dB-Hz | 220 Hz | 1.5 Hz |
| II, | ON, | 5 ms | 24 dB-Hz | 45 Hz | 0.09 Hz |
| II, | ON, | 10 ms | 20 dB-Hz | 23 Hz | 0.06 Hz |
| II, | OFF, | 5 ms | 16 dB-Hz | 90 Hz | 0.7 Hz |
| III, | OFF, | 10 ms | <10 dB-Hz | 40 Hz | 3.2 Hz |
| IV, | OFF, | 10 ms | <10 dB-Hz | 45 Hz | 0.2 Hz |

As discussed above, the GPS and GLONASS AFC pull-in procedure can have three and four stages, respectively. Note that to successfully transition from one stage to the next, the residual frequency error of the previous stage should be less than the pull-in frequency of the next stage. To ensure this condition, a frequency error detector can be provided to make the transition decision. A good frequency error detector can minimize the time spent in the previous stage, ensure a fast transition from the previous stage to the next stage, and optimize the pull-in of the next stage.

In one embodiment, the transition decision can be implemented by using frequency error estimation at the frequency discriminator output. The estimation can be determined as follows:

$$\text{afc.freqMS} = \text{afc.freqMS} + (\text{freq\_error}^2 - \text{afc.freqMS})/32 \quad \text{(Eq. 1)}$$

wherein freq_error is the discriminator output normalized in units of Hz (using the a tan 2($\Sigma$Cross, $\Sigma$Dot) discriminator as an example, freq_error would be a tan 2($\Sigma$Cross, $\Sigma$Dot)/($2\pi \times$ PDI$\times$0.001)), and afc.freqMS is the AFC frequency (mean square) initialized by the possible maximal frequency error such as the apriority maximal ACQ frequency error. The afc.freqMS is updated with the new freq_error every 20 ms during loop tracking. If the frequency error estimation is below a certain threshold, then the transition to the next stage is allowed.

This frequency error estimation technique is effective when the signal strength is relatively high. However, when the signal becomes weak, the frequency error estimate using the discriminator output is biased significantly towards zero. This biasing can result in a false transition decision, thereby causing the next stage to fail to pull-in.

Figure 5:
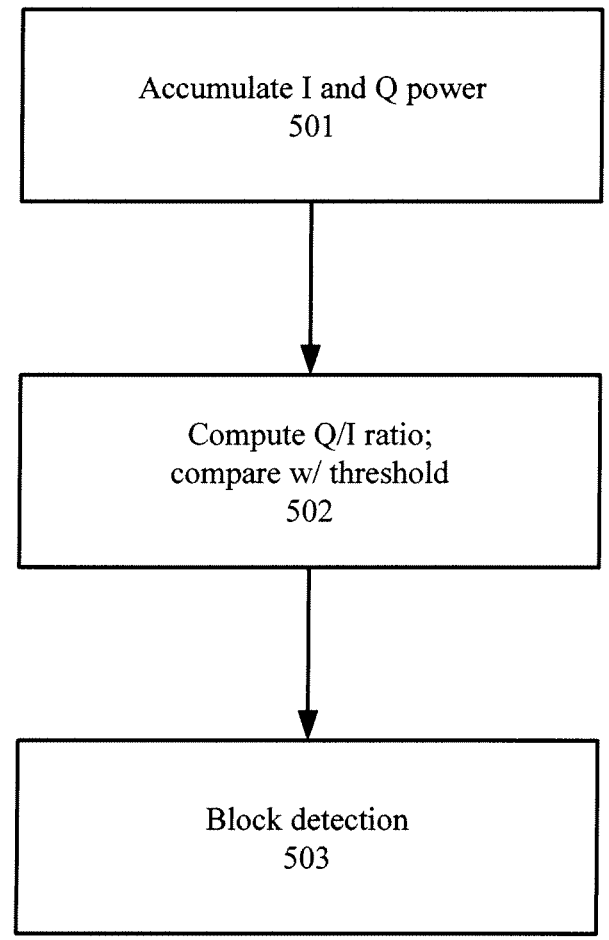
FIG. 5 illustrates a frequency error estimation technique that works for weak signals.

Therefore, another frequency error estimation technique that works for weak signals can be provided, as described in FIG. 5. In step 501, the 20 ms Cross and Dot values of the AFC discriminator (which correspond to I and Q values) can be exponentially averaged using the following computations.

$$\text{afc.crossSum} = \text{afc.crossSum} + (\text{afc.discr\_sum} - \text{afc.crossSum})/32$$

$$\text{afc.dotSum} = \text{afc.dotSum} + (\text{afc.discr\_dot\_sum} - \text{afc.dotSum})/32$$

where afc.discr_sum is $\Sigma$Cross and afc.discr_dot_sum is $\Sigma$Dot (described in reference to FIG. 1).

In step 502, the ratio of the averaged Cross and Dot values can be compared with a frequency-offset related threshold to determine whether the current frequency error falls in the acceptable region of the next stage. In one embodiment, the threshold can be mapped to frequency as a tan(threshold)/$(2 * \pi * \text{PDI} * 0.001)$. When the ratio is less than the threshold, the frequency is "locked" and ready for transition to the next step (LCKDTR), as indicated below.

$$\text{LCKDTR} = (\text{abs}(\text{afc.crossSum})/(\text{afc.dotSum}) < \text{threshold}) \quad \text{(Eq. 2)}$$

The frequency lock detection of step 502 can be evaluated every 20 ms.

In step 503, a transition decision can be made after 30 consecutive lock detections (30 out of 30, which would take 600 ms). These consecutive lock detections are also called block detection. This enhanced lock detector is expressed as $$\text{Enh\_LCKDTR} = (\text{sum}(\text{LCKDTR}(\text{end}-29:\text{end})) == 30) \quad \text{(Eq. 3)}$$

Figure 6:
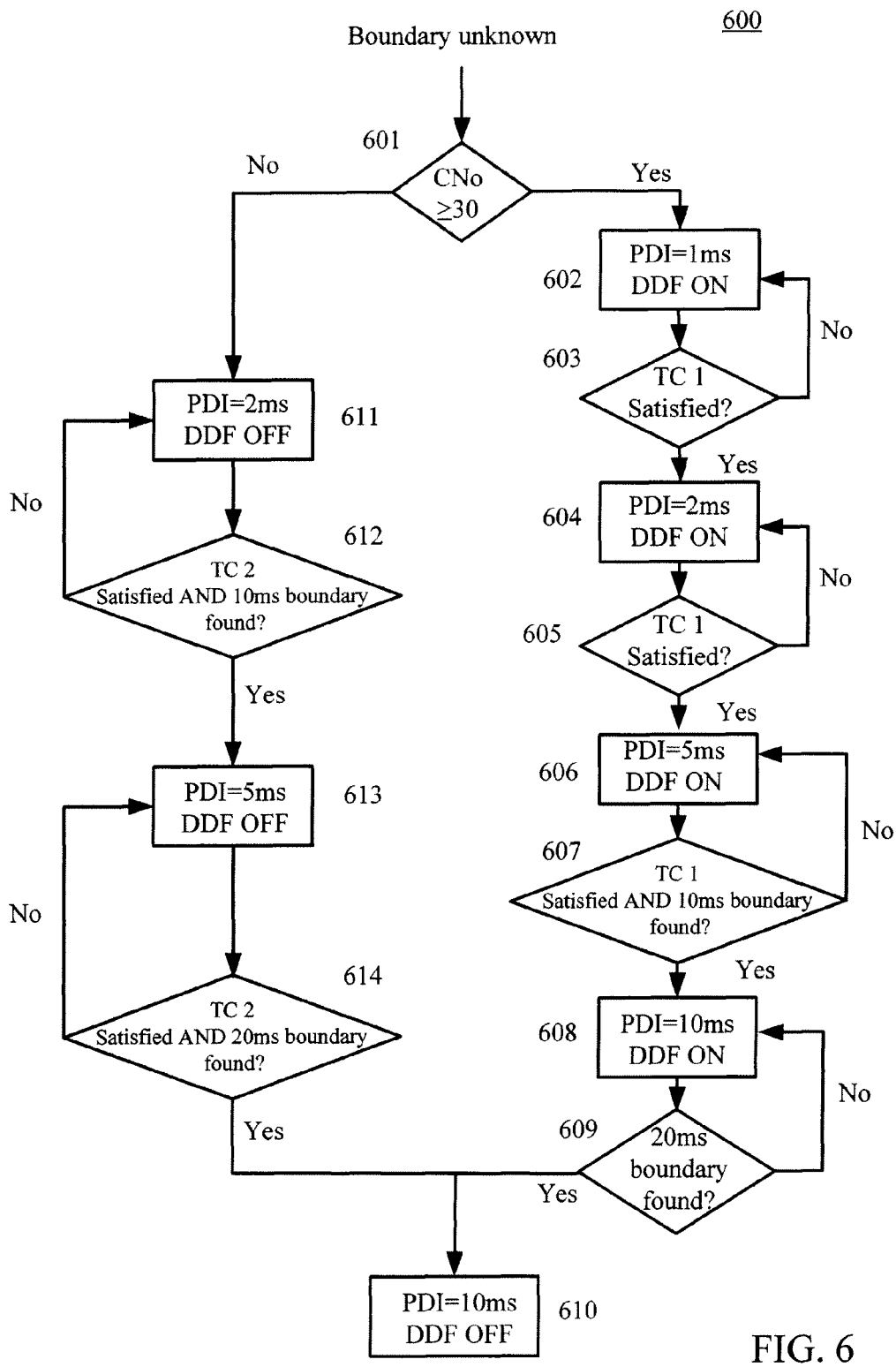

FIG. 6 illustrates an exemplary two-mode, four-stage technique 600 for a GLONASS AFC pull-in. Technique 600 is based on Table 1 and the above-described frequency error detection technique described. In technique 600, step 601 determines whether the received bits have a CNo greater than or equal to 30 dB-Hz, thereby indicating a strong signal. If so, then step 602 uses a PDI=1 ms and turns DDF ON. Then, step 603 determines whether a first test condition (TC1) is satisfied, wherein the first test condition includes a bad dot count test, which counts the number of 'dot<0' events, and the above described frequency error estimation (Eq. 1). If not, then technique 600 continues to use PDI=1 ms and DDF ON. If so, then step 604 uses PDI=2 ms with DDF ON.

Step 605 then determines whether the first test condition is satisfied. If not, then technique 600 continues to use PDI=2 ms and DDF ON. If so, then step 606 uses PDI=5 ms with DDF ON.

Step 607 then determines whether the first test condition is satisfied and whether the 10 ms boundary has been found. Determining bit synchronization is described in detail in U.S. patent application Ser. No. 12/870,533, entitled "GLONASS Bit Boundary Detection", filed on Aug. 27, 2010 by Atheros Communications, Inc., and incorporated by reference herein. If one or both conditions are not satisfied, then technique 600 continues to use PDI=5 ms and DDF ON. If both conditions are satisfied, then step 608 uses PDI=10 ms with DDF ON.

Step 609 then determines whether the 20 ms boundary has been found. If not, then technique 600 continues to use PDI=10 ms and DDF ON. If so, then step 610 uses PDI=10 ms, but turns off DDF (DDF OFF).

Referring back to step 601, when the received bits have a CNo less than 30 dB-Hz, thereby indicating a weak signal, then step 611 uses a PDI=2 ms and turns off DDF (DDF OFF). Step 612 then determines whether the second test condition (TC 2) is satisfied and whether the 20 ms boundary has been found. The 20 ms boundary detection is also described in U.S. patent application Ser. No. 12/870,533. In one embodiment, the second test condition is the above-described frequency lock technique (Eq. 2). If one or both conditions are not satisfied, then technique 600 continues to use PDI=2 ms and DDF OFF. If both conditions are satisfied, then step 613 uses PDI=5 ms with DDF OFF.

Step 614 then determines whether the second test condition is satisfied and whether the 20 ms boundary has been found. If one or both conditions are not satisfied, then technique 600 continues to use PDI=5 ms and DDF OFF. If both conditions are satisfied, then step 610 uses PDI=10 ms with DDF OFF.

Note that for steps 602-609 (DDF-ON), a frequency error detector using the discriminator output can be used for the stage transition decision. In contrast, for steps 611-614 (DDF-OFF), a frequency lock based detector can be used for the stage transition decision.

Figure 7:
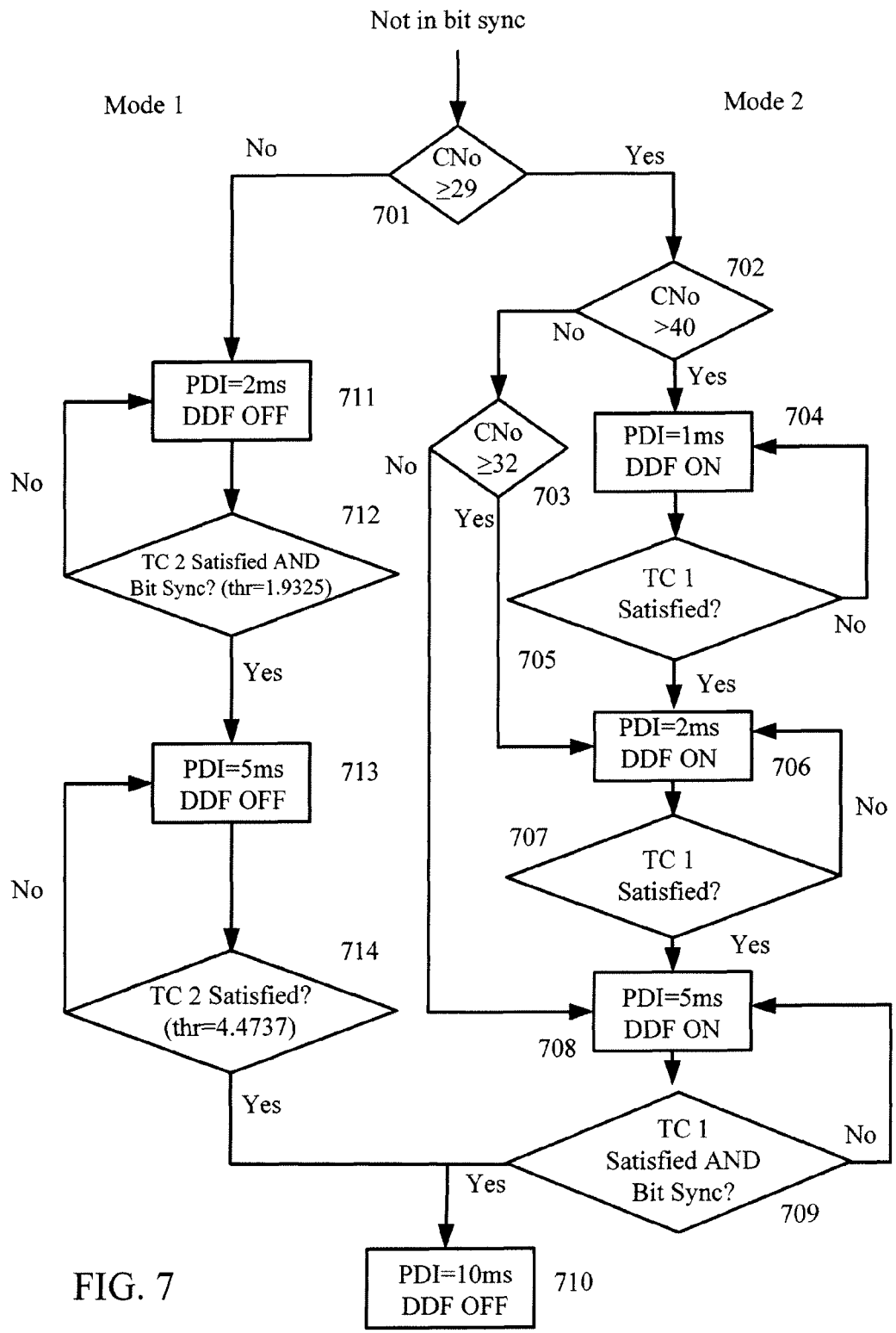

The technique described in FIG. 6 for GLONASS can be applied to a GPS AFC pull-in procedure, which is shown in FIG. 7. Specifically, FIG. 7 illustrates an exemplary two-mode, three-stage technique 700 for GPS AFC pull-in. Technique 700 is similar to technique 600 for GLONASS, but uses CNos and PDI stages appropriate for GPS. For example, in technique 700, step 701 determines whether the received bits have a CNo greater than or equal to 29 dB-Hz, thereby indicating a relatively strong signal for GPS. If so, then step 702 determines whether the received bits have a CNo greater than 40 db-Hz, thereby indicating a very strong signal for GPS. If so, then step 704 uses a PDI=1 ms and turns DDF ON. Then, step 705 determines whether both the bad dot count and the afc.freqMS tests, i.e. TC1, are satisfied. As noted above, the bad dot count test counts the number of 'dot<0' events, and afc.freqMS refers to the above described frequency error estimation (Eq. 1). If not, then technique 700 continues to use PDI=1 ms and DDF ON. If so, then step 706 uses PDI=2 ms with DDF ON.

Step 707 then determines whether the first test condition TC1 is satisfied. If not, then technique 700 continues to use PDI=2 ms and DDF ON. If so, then step 708 uses PDI=5 ms with DDF ON.

Step 709 then determines whether the first test condition TC1 is satisfied and whether a bit synchronization has been achieved. Determining bit synchronization is described in detail in U.S. patent application Ser. No. 12/870,533. If one or both conditions are not satisfied, then technique 700 continues to use PDI=5 ms and DDF ON. If both conditions are satisfied, then step 710 uses PDI=10 ms and turns off DDF (DDF OFF).

If the CNo is not greater than 40 dB-Hz, then step 703 determines whether the CNo is equal to or greater than 32 dB-Hz. Note that a smaller PDI may lead to a larger frequency pull-in capability, but may require a stronger CNo to operate. On the other hand, the frequency error range brought by acquisition is wider in a strong signal and narrower in a weak signal. Therefore, the PDI initial setting can be reduced and a smaller PDI can be applied for a strong signal. If the CNo is greater than 40 dB-Hz, then technique 700 proceeds to step 706 (PDI=2 ms). If not, then technique 700 proceeds to step 708 (PDI=5 ms).

Referring back to step 701, when the received bits have a CNo less than 29 dB-Hz, thereby indicating a weak signal, then step 711 uses a PDI=2 ms and turns off DDF (DDF OFF). Step 712 then determines whether the second test condition (TC 2) is satisfied and whether a bit synchronization is achieved. In one embodiment, the second test condition is the above-described frequency lock technique (Eq. 2, using a threshold of 1.9325). If one or both conditions are not satisfied, then technique 700 continues to use PDI=2 ms and DDF OFF. If both conditions are satisfied, then step 713 uses PDI=5 ms with DDF OFF.

Step 714 then determines whether the second test condition T2 is satisfied with a threshold of 4.4737. If T2 is not satisfied, then technique 700 continues to use PDI=5 ms and DDF OFF. If T2 is satisfied, then step 710 uses PDI=10 ms with DDF OFF. Note that for steps 702-709 (DDF-ON), a frequency error detector using the discriminator output can be used for the stage transition decision. In contrast, for steps 711-714 (DDF-OFF), a frequency lock based detector can be used for the stage transition decision.

In another embodiment, an AFC step-back mechanism is provided. This AFC step-back can allow a rapid decrease in the AFC PDI value when an extra fast recovery is needed. Various performance checks can be used to monitor abnormalities in the AFC loop, which would necessitate the extra fast recovery.

For example, in a first performance check, a bad Dot count can be monitored. Specifically, a Dot should be positive for strong signal in the final stage, i.e. after the bit boundary and time-marker are detected. Thus, a valid bad Dot count detection could be:

```
When CN0 ≥30dB-Hz,
   if (Dot < 0)
   {
        badDotCount = badDotCount + PDI;
   }elseif (badDotCount > −10)
   {
        badDotCount = badDotCount − PDI;
   }
   if (badDotCount ≥70)   ->   claim 'badDotCount' check failure.
```

In a second performance check, the AFC (mean square) can be monitored. Specifically, when the afc.freqMS measured by Eq. 1 becomes larger than the threshold for that particular PDI, an afc.freqMS check failure can be triggered.

In a third performance check, the frequency lock can be monitored. In contrast to Eq. 3, a frequency lock detector can be devised for the capability to work for a weak signal. If the 'LCKDTR' detection fails for a large probability, such as when CN0<30 dB-Hz and CN0>16 dB-Hz $$LCKDTR\_DIVG=(sum(LCKDTR(end-29:end))<15)$$

then a frequency lock check failure can be triggered.

In a fourth performance check, alias tracking can be monitored. For example, an AFC loop could track the side lobe of a strong satellite signal. In one embodiment, the detection algorithm of the side-lobe tracking can be based on the power estimation. Assuming that the 1 ms prompt tap signal is Pr and the noise tap signal is Nt, then the signal power (SP) can be estimated as:

$$SP=\text{IIR\_filtering}(|\text{sum\_PDI}(Pr)/\text{PDI}|^2 - |\text{sum\_PDI}(Nt)/\text{PDI}|^2)$$

Thus, the wideband signal power (WSP) can be estimated as:

$$WSP=\text{IIR\_filtering}(|Pr|^2) - \text{IIR\_filtering}(|\text{sum\_PDI}(Nt)|^2/\text{PDI})$$

In one embodiment, when CN0≥27 dB-Hz, an alias tracking check failure can be triggered when (WSP>2*SP).

Once a check failure is triggered, the AFC loop can step back to a precursor (i.e. smaller) PDI setting and reattempt to track the correct signal frequency. At the same time, the PDI of the DLL and the CNo estimation can also be stepped back to smaller values. (DLL and CNo PDIs advance and retreat with regard to AFC PDI, after the boundary synchronization is achieved.) For example, it is set in GLONASS as:

| AFC PDI | 1 ms | 2 ms | 5 ms | 10 ms |
|---------|------|------|------|-------|
| DLL PDI | 4 ms | 4 ms | 10 ms | 20 ms |
| CNo PDI | 5 ms | 5 ms | 10 ms | 20 ms |

Note that the AFC could also face extreme scenarios for sudden and significant receiving signal drops. In one embodiment, a signal strength test can be applied to deal with such scenarios. For example, a very low-pass filtered signal power and noise power can be used to monitor the receiving signal strength. If the very low-pass filtered signal power is smaller than a certain proportion (e.g. a scaling threshold) of that of the noise power, then a significant receiving signal loss is declared. In that case, the AFC loop can be changed to a "coast" state. In this coast state, the AFC loop can be opened, thereby allowing the rate portion (i.e. the integrate memory part) of the loop to slowly decay. If no signal recovery is detected within a predetermined time in the coast state, then the current channel can be dropped.

Figure 8:
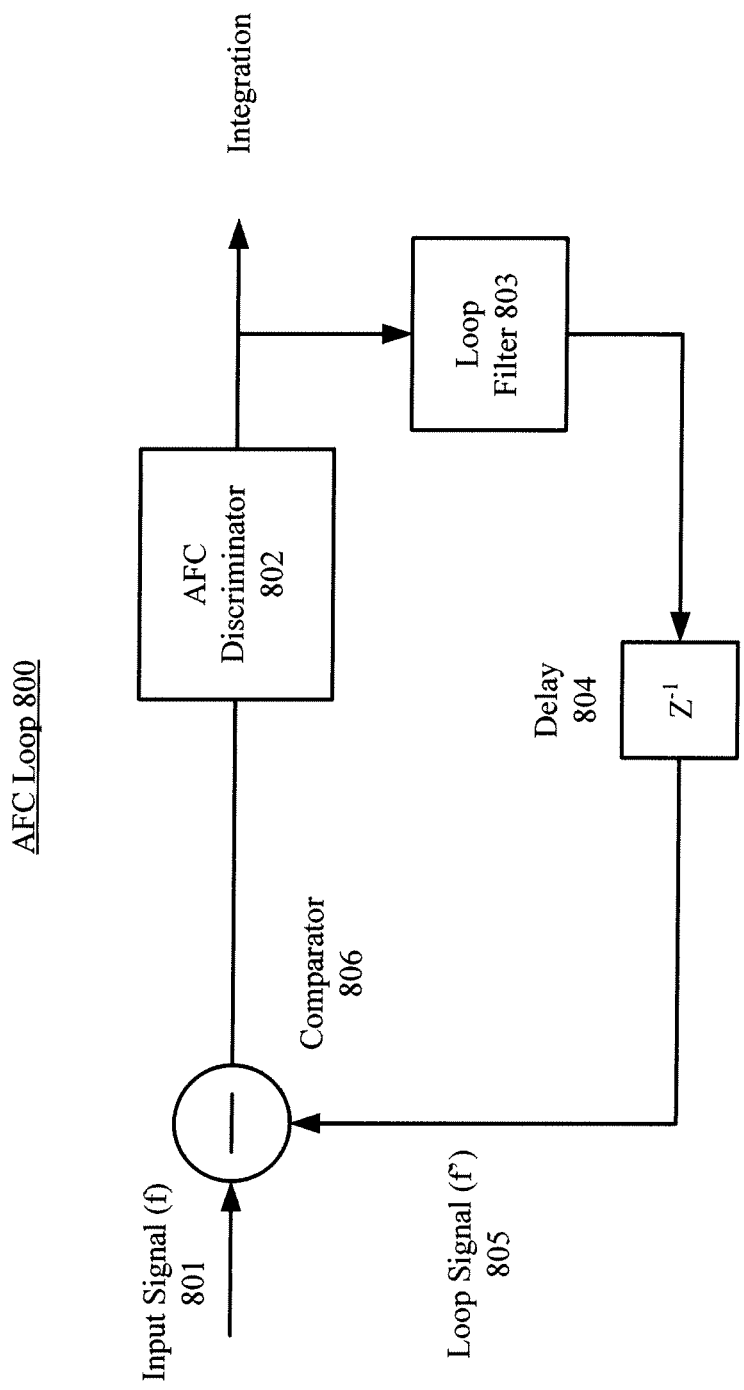
FIG. 8 illustrates an exemplary AFC loop.

FIG. 8 illustrates an exemplary AFC loop 800 including an AFC discriminator 802, a loop filter 803, a delay element 804, and an adder 806. AFC discriminator 802 can be configured similar to that shown in FIG. 1, i.e. AFC discriminator 100. The output of AFC discriminator 802, which reflects a frequency error, can be provided to loop filter 803. Loop filter 803 can perform $1^{st}$ order or $2^{nd}$ order filtering, wherein $1^{st}$ order filtering can estimate frequency and $2^{nd}$ order can estimate acceleration. Consistent with standard industry terminology, when loop filter 803 performs $1^{st}$ order filtering, AFC loop 800 can be called a $1^{st}$ order AFC. Similarly, when loop filter 803 performs $2^{nd}$ order filtering, AFC loop 800 can be called a $2^{nd}$ order AFC. The output of loop filter 803 can be provided to a delay element 804. Delay element 804, in turn, provides a loop signal 805, which has a frequency f'. Adder 806 subtracts loop signal 805 from an input signal 801 and provides that difference to AFC discriminator 802 (shown in FIG. 1 as a 1 ms correlator prompt output). As described in further detail below, AFC loop 800 has an associated update interval.

Figure 9:
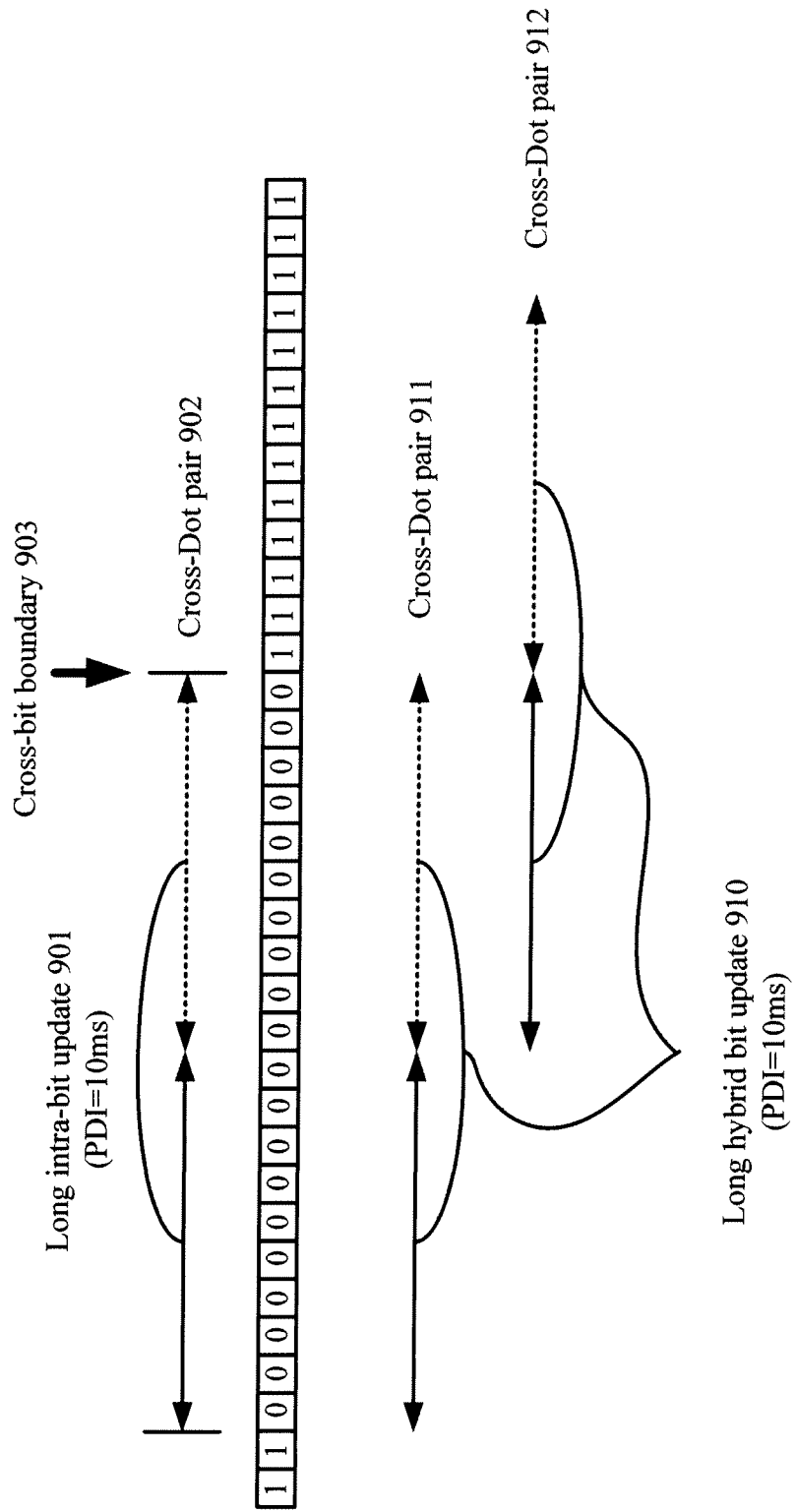
FIG. 9 illustrates an exemplary long hybrid (i.e. inter-bit and intra-bit at PDI=10 ms) AFC update with a cross-bit-boundary cross-dot pair.

Referring to FIG. 9, in the techniques described above (i.e. techniques 600 and 700), the AFC loop uses a 20 ms update interval and PDI=10 ms when the bit sync is found. That is, the AFC discriminator 100 (FIG. 1) can perform the techniques 600 and/or 700 (depending on whether GLONASS or GPS signals are being received) every 20 ms. In either technique, each bit is divided into two 10 ms segments to compute the cross-dot discriminator output, e.g. long intra-bit update 901 using a cross-dot pair 902.

In another update technique, every other update still uses the two 10 ms segments within a bit, e.g. long intra-bit update 901. However, each update between long intra-bit updates 901 can be a hybrid update including a cross-bit-boundary pair. For example, a long hybrid bit update 910 can use cross-dot pair 911 and cross-dot pair 912, both pairs being 10 ms segments. However, in update 910, cross-dot pair 911 is intra-bit whereas cross-dot pair 912 is inter-bit, i.e. having two 10 ms segments belonging to different bits and straddling a cross-bit boundary 903 (wherein a cross-bit boundary is where the value of a bit changes). Notably, using cross-dot pair 912 with DDF ON may reduce the AFC dynamic handling. Therefore, as described below in further detail, an improved update technique may selectively use the cross-bit boundary discriminator output.

Figure 10:
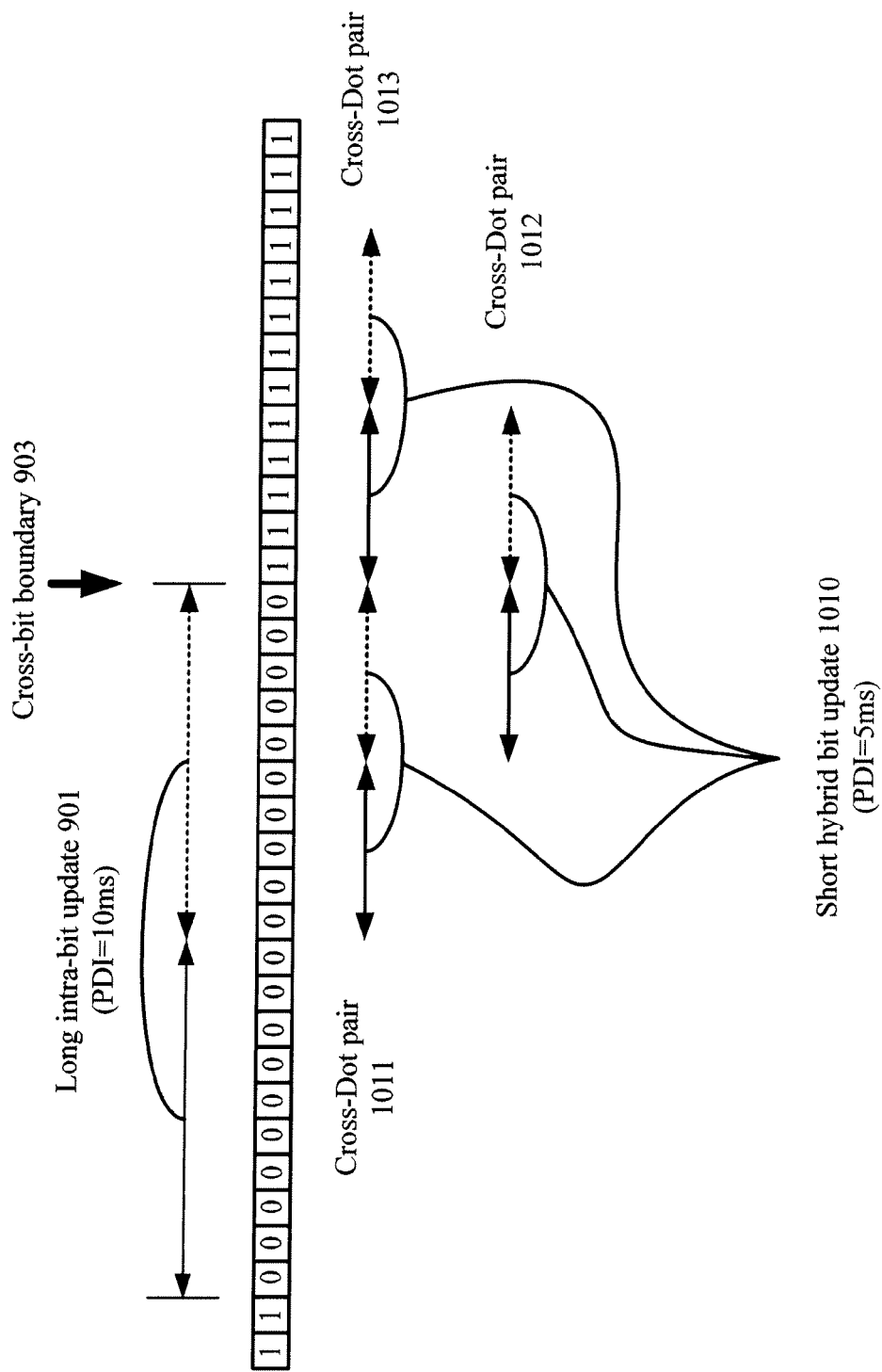
FIG. 10 illustrates an exemplary short hybrid (i.e. inter-bit and intra-bit at PDI=5 ms) AFC update with a cross-bit-boundary cross-dot pair.

AFC sensitivity can be further improved by reducing the loop update time to 10 ms, i.e. PDI=5 ms. For example, referring to FIG. 10, a short hybrid bit AFC update 1010 can include three successive cross-dot pairs 1011, 1012, and 1013 at 5 ms intervals. Note that cross-dot pairs 1011 and 1013 are associated with different bits and cross-dot pair 1012 is a cross-boundary-bit pair because it straddles cross-bit boundary 903. Because cross-dot pair 1012 crosses different bits, DDF is turned ON for the processing of cross-dot pair 1012.

In one embodiment, the AFC discriminator output computed using the integration of cross-dot pairs 1011, 1012, and 1013 can be scaled down by a value less than 1 (e.g. 0.5) when signal strength is below the design point. Using this set of cross-dot pairs can provide twice the dynamic handling with smaller frequency error variance above the design point. Thus, if the design loop bandwidth is reduced by half, short hybrid update 1010 can provide similar dynamic handling and about half the frequency error RMS above the design point when compared with an AFC loop using long intra-bit update 901 (shown for reference only in FIG. 10). Thus, this scaling is needed when using cross-dot pairs 1011, 1012, and 1013 to ensure substantially similar error variance compared to that associated with cross-dot pair 901, thereby stabilizing the AFC loop.

Figure 11:
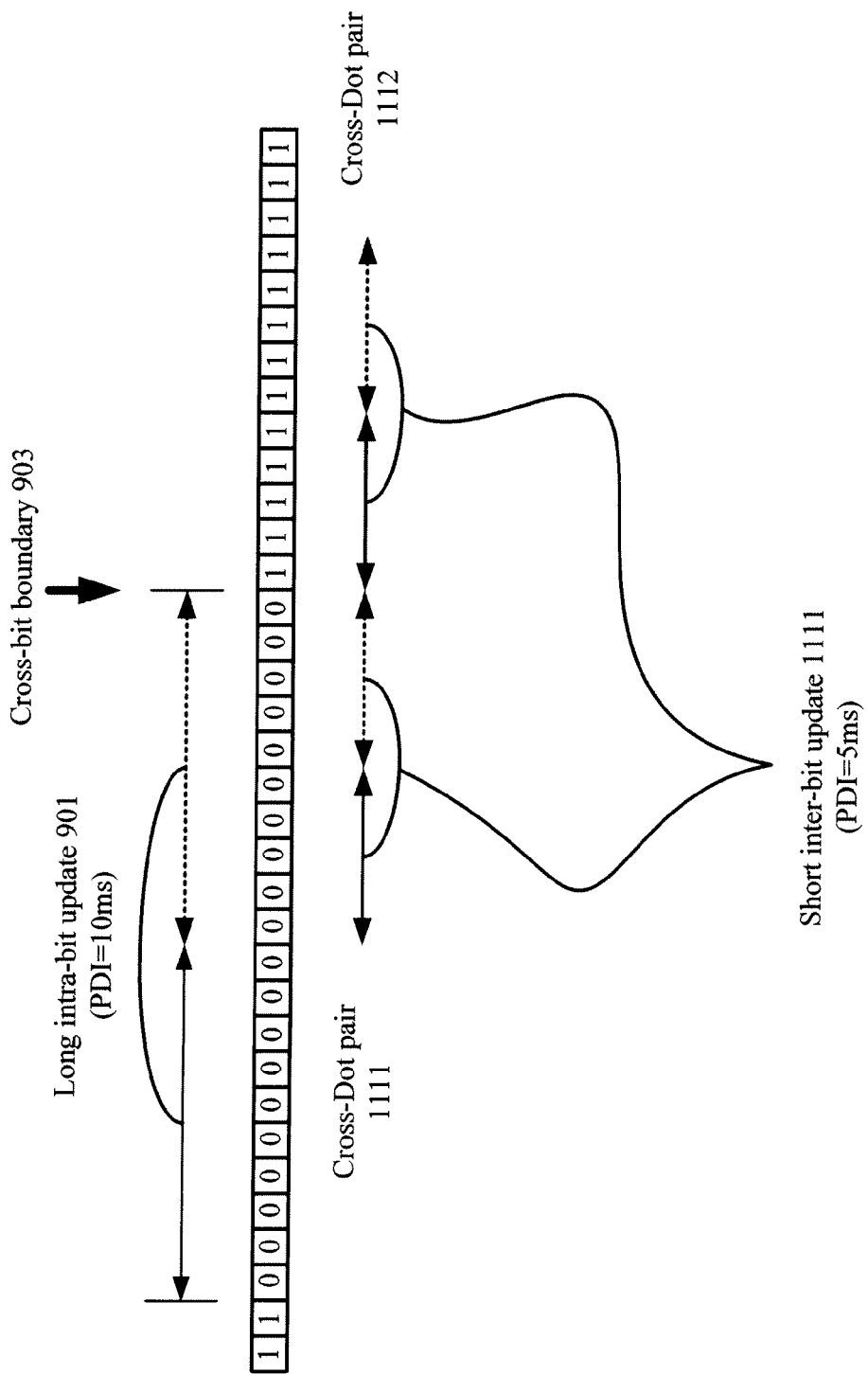
FIG. 11 illustrates an exemplary short (i.e. PDI=5 ms) inter-bit AFC update, but without a cross-bit-boundary cross-dot pair.

FIG. 11 illustrates an exemplary short inter-bit AFC update, but without a cross-bit-boundary cross-dot pair. Specifically, a short inter-bit update 1110 can include two successive cross-dot pairs 1111 and 1112 (each PDI=5 ms). Note that cross-dot pairs 1111 and 1112 are associated with different bits and neither pair straddles cross-bit boundary 903. Therefore, DDF may be turned OFF for the processing of cross-dot pairs 1111 and 1112. In one embodiment, the AFC discriminator output can be computed using the sum of cross-dot pairs 1111 and 1112, which can then be scaled down by a value less than 1 (e.g. $1/\sqrt{8}$) to maintain the same error variance as the AFC loop using long intra-bit update 901 (i.e. as the update below the design point).

Simulation shows that short inter-bit update 1110 works well below the design point. For example, by reducing the design loop bandwidth to half and implementing a $1^{st}$ order FLL (frequency lock loop), the performance of short inter-bit update 1110 is comparable with the performance of long intra-bit update 901 (shown for reference in FIG. 11) with a $1^{st}$ order FLL. Exemplary performance results are listed below in Table 2.

TABLE 2

Sensitivity performance comparison of 20 ms and 10 ms AFC loop update (FIG. 11 as reference)

| Sensitivity | 20 ms update $1^{st}$ order AFC | 10 ms update (2 × 5 ms) $1^{st}$ order AFC |
|---|---|---|
| Static (no acceleration) | 7 dB-Hz | 4 dB-Hz |
| 0.25 Hz/s acceleration | 8 dB-Hz | 4 dB-Hz |
| 0.50 Hz/s acceleration | 9 dB-Hz | 8 dB-Hz |
| 0.75 Hz/s acceleration | 10 dB-Hz | 9 dB-Hz |
| 1.0 Hz/s acceleration | 10 dB-Hz | 10 dB-Hz |

Thus, by exploiting the bit boundary crossing data for 10 ms loop update, the tracking sensitivity can be improved under very low dynamic cases.

In one embodiment, the 10 ms loop update can be used to reduce the tracking frequency error above the design point (see, e.g. FIG. 10) and improve the tracking sensitivity (see, e.g. FIG. 11).

Similar to data wipe-off acquisition, tracking sensitivity can be improved if data bit assistance is available, i.e. when at least some transmission bit values (logic one or logic zero) are known. With data bit polarity wiped off (which then appears to be a clear carrier), a longer PDI can be used to improve the CNo of the AFC discriminator and thus the tracking sensitivity.

Indeed, by extending the PDI period, the tracking sensitivity can be significantly improved. Exemplary results for the PDI=20 ms and PDI=40 ms are provided below in Table 3. However, note that a further PDI period increase may improve the sensitivity only if the dynamic is small.

TABLE 3

Sensitivity performance comparison with data wipe-off tracking

| Sensitivity | PDI = 10 ms 20 ms update 1st order AFC | PDI = 20 ms 20 ms update 2nd order AFC | PDI = 40 ms 40 ms update 2nd order AFC | PDI = 40 ms 40 ms update 2nd order AFC (twice digital loop bandwidth) |
|---|---|---|---|---|
| 1 Hz/s acceleration | 10 dB-Hz | 6 dB-Hz | 7 dB-Hz | 4 dB-Hz |

Note that the AFC discriminator and techniques described in reference to FIGS. 1-7 are described further in U.S. patent application Ser. No. 12/894,067, entitled "Multi-stage GLONASS/GPS Automatic Frequency Control," which was filed on Sep. 29, 2010 and is incorporated by reference herein.

In accordance with another embodiment, a frequency rake structure can be used for weak signal tracking. In this structure, a plurality of carrier wiping units (which can be characterized as prongs of the frequency rake) can be used on a signal over a certain period. Using the metric of detected signal strength, the frequency rake can determine the most likely carrier frequency. This most likely carrier frequency can then be selected. For optimal performance, the center frequency of the frequency rake in the next time period can be updated to the selected carrier frequency. This updating can effectively track even weak signals.

Figure 12:
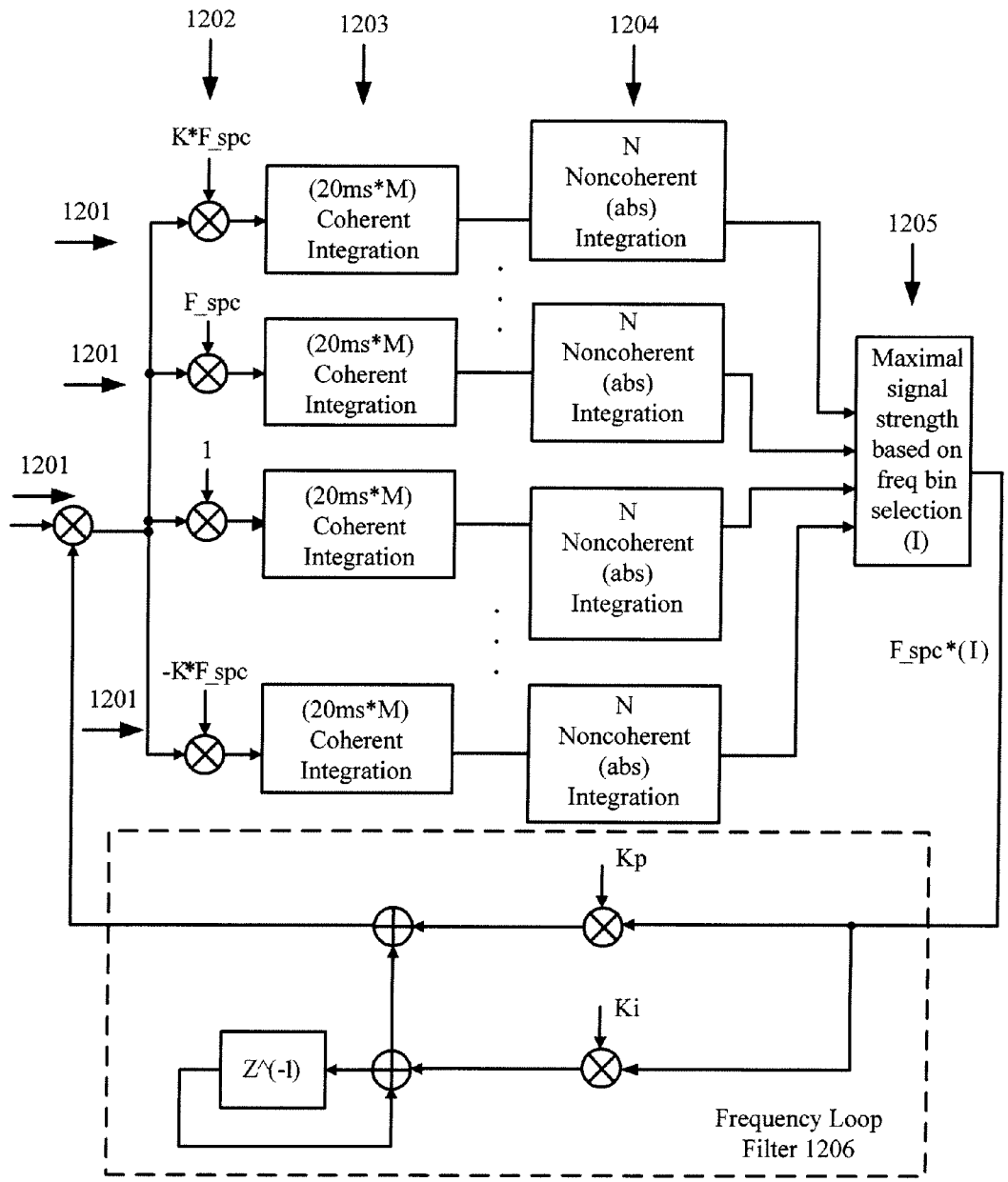
FIG. 12 illustrates an exemplary frequency rake structure.

FIG. 12 illustrates an exemplary frequency rake 1200 configured for frequency rake tracking. In this embodiment, frequency rake has 2*K+1 branches 1201, wherein K is the bin number of the maximum frequency offset. Each branch 1201 can operate at a different frequency, as determined by its mixer stage 1202 (which applies either a unity value (one branch) or a multiple of a frequency spacing F_spc). Each branch 1201 further includes a coherent integration stage 1203 and a non-coherent integration stage 1204. The output of each non-coherent integration stage 1204 is indicative of the detected signal strength for that particular branch.

A selection unit 1205 can receive those outputs and then choose the frequency bin with the largest detected signal strength. Note that the frequency offset of the selected frequency bin is the frequency rake discriminator output. This frequency rake discriminator output F_spec*(I) can be used to drive a frequency loop filter 1206 to close the loop for optimized frequency rake tracking.

In one embodiment, a maximum possible coherent integration length can be set to 20 ms. Initially, a zero frequency offset, a predetermined acceleration offset, and zero jerk can be used. Note that a non-coherent integration time equal to 4 sec performs better than that equal to 3 sec. Moreover, a frequency spacing equal to 8 Hz performs better than that equal to 16 Hz.

A set of parameters can be chosen to achieve different acceleration tolerance for a $2^{nd}$ order loop with 9 frequency bins. Exemplary parameters include: Kp=0.125, Ki=Kp^2/6, freq_spc=8 Hz, and a non-coherent integration time=4 sec. The performance, i.e. CNo and divergent rate, of a frequency rake using these parameters is shown in Table 1.

TABLE 1

| | CNo | | | | | | | |
|---|---|---|---|---|---|---|---|---|
| Accel | 10 | 9 | 8 | 7 | 6 | 5 | 4 | 3 |
| 0 Hz/s Divg | 0 | 0 | 0 | 0 | 0 | 0 | 0 | 0 |
| 0.25 Hz/s Rate | 0 | 0 | 0 | 0 | 0 | 0.03 | 0.06 | 0.12 |

A different set of parameters can be chosen to achieve higher acceleration tolerance. Exemplary parameters include: Kp=0.25, Ki=Kp^2/6, freq_spc=8 Hz, and a non-coherent integration time=4 sec. The performance, i.e. CNo and divergent rate, of a frequency rake using these parameters is shown in Table 2.

TABLE 2

| | CNo | | | | | | | |
|---|---|---|---|---|---|---|---|---|
| Accel | 10 | 9 | 8 | 7 | 6 | 5 | 4 | 3 |
| 0.5 Hz/s Divg | 0 | 0 | 0 | 0.04 | 0.07 | 0.15 | 0.21 | 0.32 |
| 0.75 Hz/s Rate | 0 | 0 | 0.02 | 0.04 | 0.11 | 0.24 | 0.38 | 0.48 |
| 1 Hz/s | 0 | 0 | 0.02 | 0.07 | 0.19 | 0.39 | 0.51 | 0.69 |

Note that the divergent rates in TABLES 1 and 2 have been tested over 100 runs with 200 sec for each run and the end freq error threshold set as 50 Hz.

A set of good parameters can also be chosen to achieve different acceleration tolerance for a $1^{st}$ order loop with 9 frequency bins. Exemplary parameters include: Kp=0.25, freq_spc=8 Hz, and a non-coherent integration time=4 sec. The performance, i.e. CNo and divergent rate, of a frequency rake using these parameters is shown in Table 3.

TABLE 3

| | CNo | | | | | | | |
|---|---|---|---|---|---|---|---|---|
| Accel | 10 | 9 | 8 | 7 | 6 | 5 | 4 | 3 |
| 0 Hz/s Divg | 0 | 0 | 0 | 0 | 0 | 0 | 0 | 0 |
| 0.25 Hz/s Rate | 0 | 0 | 0 | 0 | 0.01 | 0.01 | 0.04 | 0.08 |

A different set of good parameters can be chosen to achieve higher acceleration tolerance. Exemplary parameters include: Kp=0.5, freq_spc=8 Hz, and non-coherent integration time=4 sec. The performance, i.e. CNo and divergent rate, of a frequency rake using these parameters is shown in Table 4.

TABLE 4

| | CNo | | | | | | | |
|---|---|---|---|---|---|---|---|---|
| Accel | 10 | 9 | 8 | 7 | 6 | 5 | 4 | 3 |
| 0.5 Hz/s Divg | 0 | 0 | 0.03 | 0.06 | 0.16 | 0.23 | 0.32 | 0.41 |
| 0.75 Hz/s Rate | 0 | 0.03 | 0.07 | 0.14 | 0.27 | 0.45 | 0.56 | 0.61 |
| 1 Hz/s | 0 | 0.01 | 0.09 | 0.23 | 0.33 | 0.56 | 0.7 | 0.79 |

TABLES 1-4 show that $1^{st}$ order and $2^{nd}$ order loops perform similarly with acceleration less than and equal to 0.25 Hz/s. For stronger acceleration (up to 1 Hz/s), the $2^{nd}$ order loop performs better than the $1^{st}$ order loop for about 1 dB. Note that this performance difference is because the $1^{st}$ order loop tracks the acceleration signal with a certain residual frequency offset. Further note that, in general, the stronger the acceleration, the worse the tracking performance.

In one embodiment, based on the better tracking sensitivity performance at lower signal dynamics, acceleration aiding for the tracker can be used. For high sensitivity tracking, the user is assumed to be static or in very slow motion. In this case, the major source of the signal dynamic comes from the satellite (not user) motion.

In general, the acceleration effect due to satellite motion is below 1 Hz/sec for GPS satellites. When the satellite position is available at the receiver (using navigation computation), the tracker can estimate the satellite acceleration effect and then compensate for that effect. In that manner, the acceleration tolerance requirement can be relaxed to a minimized value, thereby facilitating higher sensitivity tracking. For example, after satellite acceleration dynamic compensation, the residual signal dynamic can be modeled as a 0.25 Hz/sec step.

Validating the performance at the acceleration step of 0.25 Hz/sec, simulations were performed for 400 sec runs. The following set of parameters was chosen for a $1^{st}$ order loop: PDI=20 ms, Kp=0.25, freq_spc=8 Hz, and a non-coherent integration time=4 sec. The performance using these parameters is shown in TABLE 5.

TABLE 5

| | | | | CNo | | | |
|---|---|---|---|---|---|---|---|
| 10 | 9 | 8 | 7 | 6 | 5 | 4 | 3 |
| divg 0 | 0 | 0 | 0 | 0.03 | 0.05 | 0.17 | 0.33 |

Note that the divergent rate in TABLE 5 is larger than that in TABLE 1 because each run now takes 400 sec to complete.

When the data is known at the receiver, longer coherent integration can be applied with the data-wiped-off signal. With 0.25 Hz/sec initial accelerate offset, simulations using 40 ms coherent integration with data wiped off (40 ms FRT) yield the following results. Non-coherent integration at 4 sec is better than 3 sec. Frequency spacing of 8 Hz is better than 4 Hz. In general, a $2^{nd}$ order loop performs better than a $1^{st}$ order loop.

Figure 13:
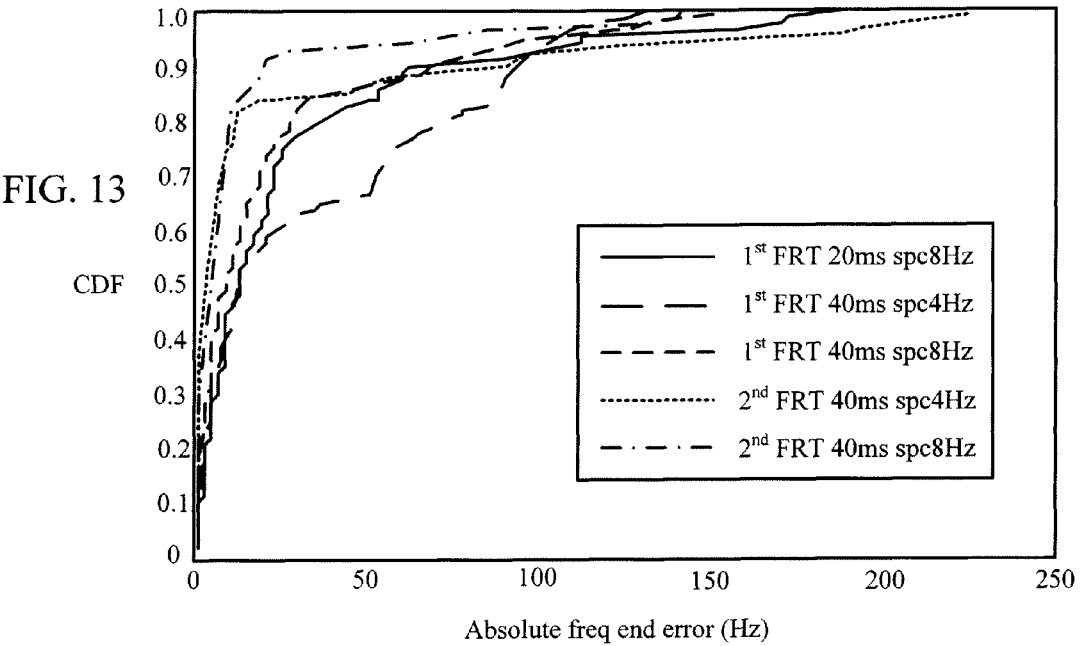
Figure 14:
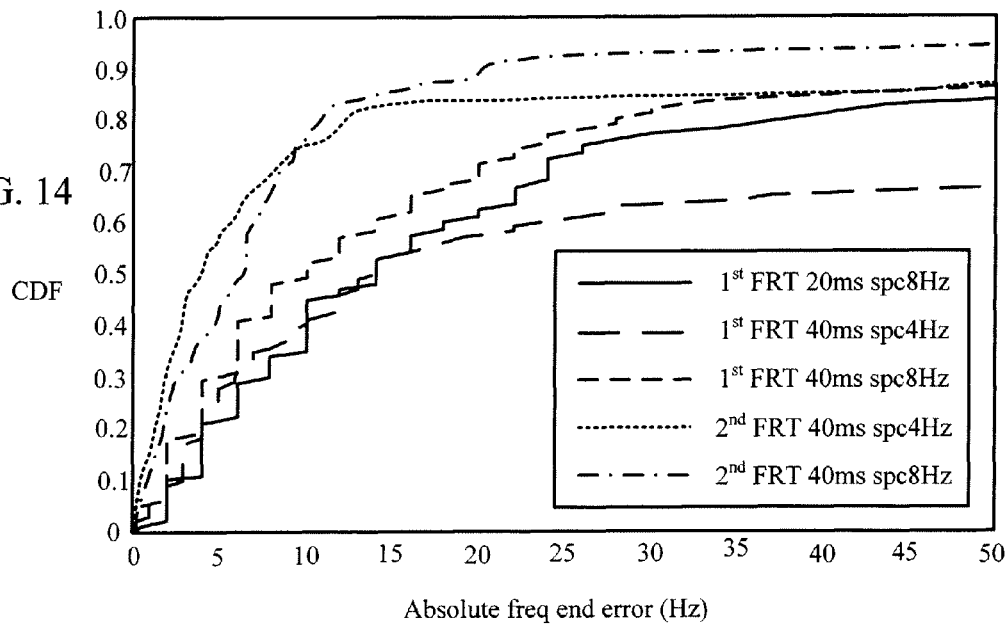

Logging the 'end frequency error' for all simulation runs, the tracking performance can be expressed in CDF (cumulative distribution function) format. The CDF results of 20 and 40 ms frequency rake tracking at 4 dB-Hz are shown in FIG. 13 and in zoomed-in detail in FIG. 14. FIG. 15 shows the CDF of the frequency rake tracking for 20 ms results.

Note that with a $2^{nd}$ order loop, 8 Hz frequency spacing, and 8 frequency bin frequency rate tracking, a 7% divergent rate (25 Hz frequency error check) can be reached at 4 dB-Hz. Comparing these results with those of FIG. 15 for 20 ms, it can be seen that frequency rake tracking at 40 ms has about a 2 dB gain in tracking sensitivity.

The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of providing automatic frequency control (AFC) tracking for reception of GLONASS signals, the method comprising:
    determining whether a channel signal to noise ratio (CNo) exceeds a threshold;
    when the CNo exceeds the threshold, performing pull-in using a first series of predetection integration (PDI) periods (PDIs) with activated decision-directed flips (DDFs) until a N ms boundary of a GLONASS data bit is found, wherein N is a positive integer, and wherein the activated DDFs selectively adjust polarities of cross-dot pairs generated based on the PDIs; and
    using a receiver, performing updates to an AFC loop, wherein performing includes:
        using a N ms update interval and PDI=(N/2)ms for every other update; and
        using a setting for an update between N ms updates, the setting using PDI=(N/4)ms.

2. The method of claim 1, wherein the setting includes a first cross-dot pair associated with a first bit, a second cross-dot pair associated with a second bit, the second bit being adjacent the first bit, and a third cross-dot pair associated with a cross-bit boundary between the first and second bits.

3. The method of claim 2, further comprising scaling down a sum of the first, second, and third cross-dot pairs by a value less than 1 when signal strength is below a predetermined threshold.

4. The method of claim 1, wherein the setting includes a first cross-dot pair associated with a first bit and a second cross-dot pair associated with a second bit, the second bit being adjacent the first bit.

5. The method of claim 4, further comprising scaling down a sum of the first and second cross-dot pairs by a value less than 1 when signal strength is below a predetermined threshold.

6. A method of providing automatic frequency control (AFC) tracking for reception of GPS signals, the method comprising:
    determining whether a channel signal to noise ratio (CNo) exceeds a threshold;
    when the CNo exceeds the threshold, performing pull-in using a first series of predetection integration (PDI) periods (PDIs) with activated decision-directed flips (DDFs) until a bit synchronization is achieved, wherein the activated DDFs selectively adjust polarities of cross-dot pairs generated based on the PDIs; and
    using a receiver, performing updates to an AFC loop, wherein performing includes:
        using a N ms update interval and PDI=(N/2)ms for every other update; and
        using a setting for an update between N ms updates, the setting using PDI=(N/4)ms.

7. The method of claim 6, wherein the setting includes a first cross-dot pair associated with a first bit, a second cross-dot pair associated with a second bit, the second bit being adjacent the first bit, and a third cross-dot pair associated with a cross-bit boundary between the first and second bits.

8. The method of claim 7, further comprising scaling down a sum of the first, second, and third cross-dot pairs by a value less than 1 when signal strength is below a predetermined threshold.

9. The method of claim 6, wherein the setting includes a first cross-dot pair associated with a first bit and a second cross-dot pair associated with a second bit, the second bit being adjacent the first bit.

10. The method of claim 9, wherein a sum of the first and second cross-dot pairs is scaled down by a value less than 1 when signal strength is below a predetermined threshold.

11. A method of providing automatic frequency control (AFC) tracking for receipt of GLONASS or GPS signals, the method comprising:
   determining whether a channel signal to noise ratio (CNo) exceeds a threshold;
   when the CNo exceeds the threshold, performing pull-in using a first series of predetection integration (PDI) periods (PDIs) with activated decision-directed flips (DDFs), wherein the activated DDFs selectively adjust polarities of cross-dot pairs generated based on the PDIs;
   when the CNo does not exceed the threshold, using a second series of PDIs with always deactivated DDFs, wherein the always deactivated DDFs do not adjust polarities of cross-dot pairs generated based on the PDIs; and
   using a receiver, performing updates to an AFC loop, wherein performing includes:
      using a N ms update interval and PDI=(N/2)ms for every other update; and
      using a setting for an update between N ms updates, the setting using PDI=(N/4)ms.

12. The method of claim 11, wherein the setting includes a first cross-dot pair associated with a first bit, a second cross-dot pair associated with a second bit, the second bit being adjacent the first bit, and a third cross-dot pair associated with a cross-bit boundary between the first and second bits.

13. The method of claim 12, further comprising scaling down a sum of the first, second, and third cross-dot pairs by a value less than 1 when signal strength is below a predetermined threshold.

14. The method of claim 11, wherein the setting includes a first cross-dot pair associated with a first bit and a second cross-dot pair associated with a second bit, the second bit being adjacent the first bit.

15. The method of claim 14, wherein a sum of the first and second cross-dot pairs is scaled down by a value less than 1 when signal strength is below a predetermined threshold.

16. A method of providing automatic frequency control (AFC) tracking for efficient, high-sensitivity reception of GLONASS or GPS signals, the method comprising:
   determining whether a channel signal to noise ratio (CNo) exceeds a threshold;
   when the CNo exceeds the threshold, performing pull-in using a first series of predetection integration (PDI) periods (PDIs) with activated decision-directed flips (DDFs), wherein the activated DDFs selectively adjust polarities of cross-dot pairs generated based on the PDIs;
   when the CNo does not exceed the threshold, using a second series of PDIs with always deactivated DDFs, wherein the always deactivated DDFs do not adjust polarities of cross-dot pairs generated based on the PDIs; and
   using a receiver, performing updates to an AFC loop, wherein performing includes:
      after wiping off data bit polarity, applying a PDI longer than 10 ms.

* * * * *